May 31, 1938. A. N. SPÁNEL 2,119,498
RUBBER ARTICLE
Original Filed June 9, 1934   2 Sheets-Sheet 1
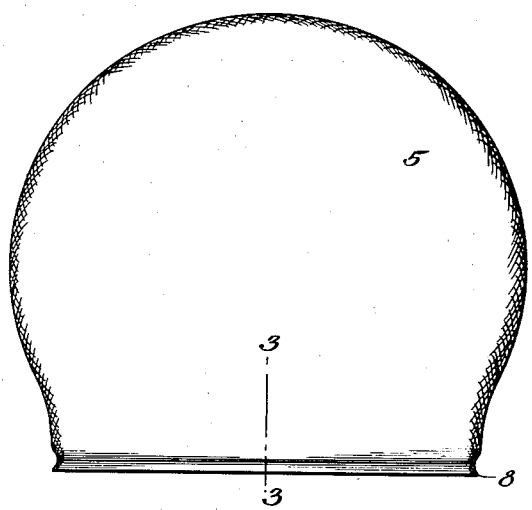
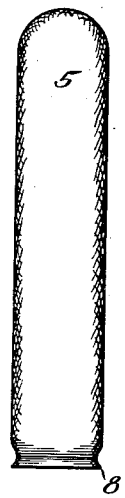
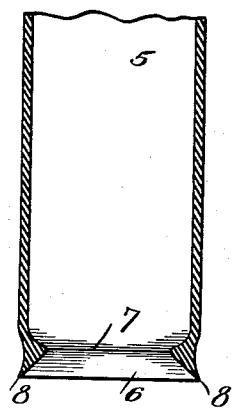
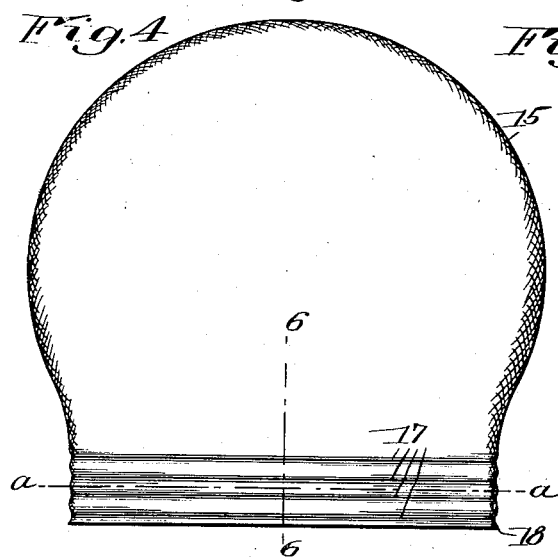
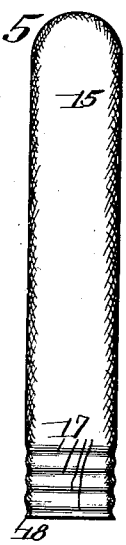
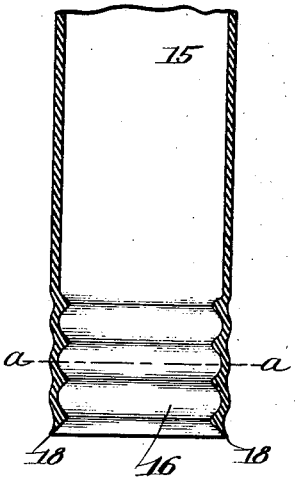
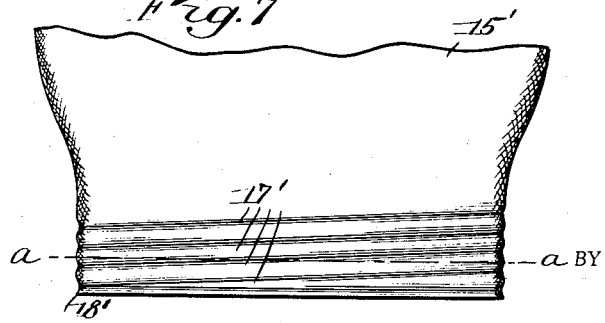
INVENTOR.
Abraham N. Spanel
D. Clyde Jones
his ATTORNEY.

May 31, 1938.  A. N. SPANEL  2,119,498
RUBBER ARTICLE
Original Filed June 9, 1934  2 Sheets-Sheet 2
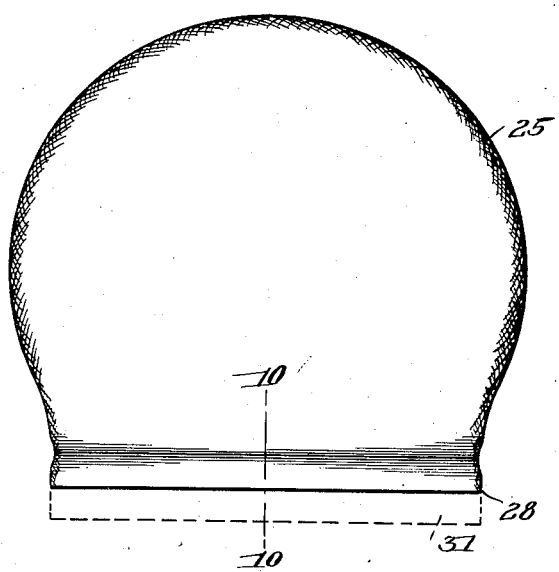
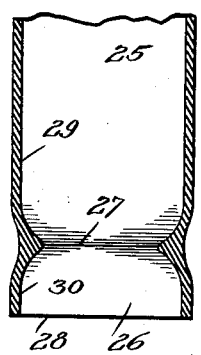
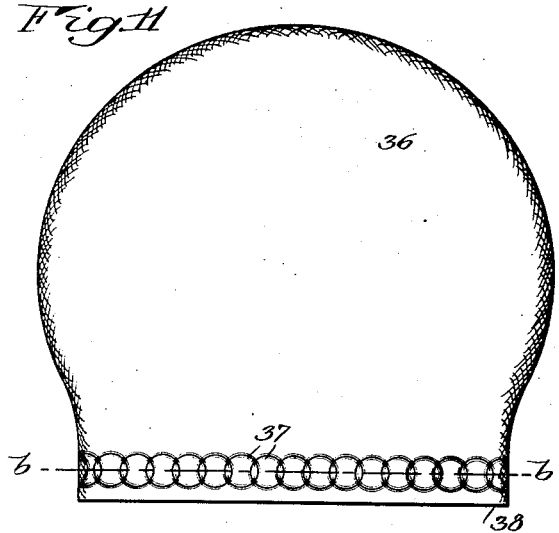
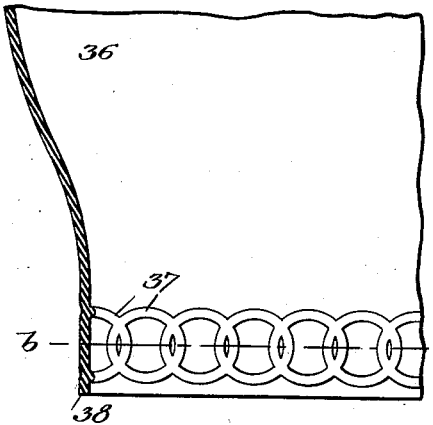
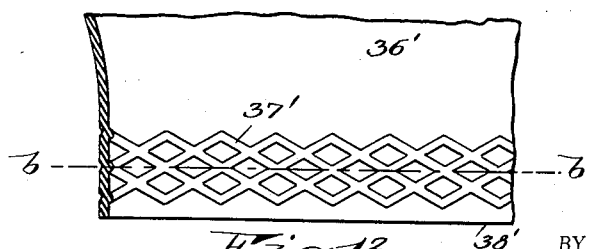
INVENTOR.
Abraham N. Spanel
BY D. Clyde Jones
his ATTORNEY.

Patented May 31, 1938

2,119,498

UNITED STATES PATENT OFFICE 2,119,498

RUBBER ARTICLE

Abraham N. Spánel, Rochester, N. Y.

Original application June 9, 1934, Serial. No. 729,875. Divided and this application July 7, 1937, Serial No. 152,399

5 Claims. (Cl. 2—68)

This invention relates to rubber articles.

It is well known that even a thin rubber article is remarkably strong as long as its edges remain intact but tears easily as soon as an edge is broken. Therefor, in order to provide a sturdy edge for a rubber article, it has been the practice to ring-roll this rubber edge or to cement a suitable reinforcing border thereto. Such methods of reinforcement are not only expensive but they also tend to produce a bulky unsightly product.

The main feature of the present invention relates to the provision of a rubber article having a novel reinforced edge, which reinforcement obviates the need of ring-rolling the edge or cementing a reinforcing border thereon or other similar expensive manufacturing operations.

A further feature of the invention relates to a bathing cap which has such a construction at the margin of the opening therein that it prevents water from entering between the cap and the head of the wearer.

These and other features of the invention will appear from the detailed description and claims when taken with the drawings in which Fig. 1 is a front view of an improved bathing cap in accordance with the invention; Fig. 2 is an edge view thereof and Fig. 3 is an enlarged cross section of a fragment of this cap taken on the line 3—3 of Fig. 1; Figs. 4 and 5 are respectively a front view and an edge view of a modified form of bathing cap; Fig. 6 is an enlarged cross section of a fragment of this modified form of cap taken on the line 6—6 of Fig. 4; Fig. 7 is a fragmentary front view of a slightly modified cap; Fig. 8 is a front view and Fig. 9 is an edge view of still another modified form of bathing cap; Fig. 10 is an enlarged cross section of a fragment of this cap taken on the line 10—10 of Fig. 8; Fig. 11 is a front view of an additional modified form of bathing cap; Fig. 12 is an enlarged cross sectional view of this last-mentioned cap showing the pattern of ridges on the inner surface thereof; and Fig. 13 is a fragmentary cross section similar to that shown in Fig. 12 illustrating a cap having a different pattern of ridges on its inner surface.

Referring to Figs. 1, 2 and 3, 5 generally designates a dipped or deposited cap comprising a layer made from liquid rubber or an aqueous dispersion of rubber which is commonly referred to as latex. This cap is shaped to closely conform to the head of the wearer and has an opening 6 therein. The marginal layer of the cap at this opening shown in Fig. 3 is reinforced by a thickened corrugation comprising a ridge 7 projecting from one surface of the layer substantially opposite a depression in the other surface of said layer. The margin of the layer terminates in a free edge 8, which is preferably made by tearing away an excess portion of the cap from the cap proper. It will be noted that the sloping sides of the ridge 7 are defined by a curved surface intersected by a plane surface which extends to the torn edge 8 of the cap. The ridge at the intersection of the surfaces is rounded.

In Figs. 4, 5 and 6, there is illustrated a modified type of cap 15 having an opening 16 therein. The marginal layer of the modified cap at this opening is reinforced by a series of parallel reeds or ridges 17 defining a generally corrugated border of the cap. It should be noted that the projecting portions of the ridges 17 are generally rounded. The border of the cap at the opening terminates in a torn edge 18. It will be appreciated that the edge 18 of the caps can be formed by cutting along the dotted line a—a instead of by tearing.

The modified cap 15' illustrated in Fig. 7 is substantially the same as that just described except that its corrugated border instead of having ridges parallel with the free edge of the cap at the opening 16 is developed by a continuous spiral ridge 17'.

The modified type of cap 25 illustrated in Figs. 8, 9 and 10 has its margin at the opening 26 therein reinforced by a ridge 27 projecting from the inner surface of the cap and adjacent the free edge 28 thereof. It will be noted that the wall portions 29 and 30 of the cap at each side of the ridge 27 are of substantially equal thickness. In practice the cap is made with an excess portion 31, indicated in dotted lines in Figs. 8 and 9, and this excess portion is severed from the cap proper leaving the edge 28 when the cap is finished.

The modified cap 36 illustrated in Figs. 11 and 12 has its margin at the head opening therein reinforced by a round pattern of intersecting circular ridges 37 adjacent the edge 38 which is preferably formed by cutting. If desired the margin of the cap may be cut away along the dotted line b—b where a semi-circular pattern is desired.

In Fig. 13, the cap 36' has its margin reinforced by a raised diamond-shaped pattern of ridges on one surface thereof.

This application is a division of applicant's copending application, Serial No. 729,875, filed June 9, 1934.

While the invention has been described in connection with rubber bathing caps, it will be understood that it is equally applicable to rubber gloves, finger cots or any other rubber article having one or more openings therein, with a reinforced margin or margins of the article around the opening or openings therein.

What I claim is:

1. An article of manufacture comprising a layer of deposited rubber, a ridge of deposited rubber integral with said layer projecting from one surface thereof, the other surface of said layer having a depression therein opposite said ridge, said ridge and depression defining a thickened reinforcement in said layer, curved in cross-section.

2. An article of manufacture comprising a layer of deposited rubber, a ridge of deposited rubber integral with said layer projecting from one surface thereof, the surface of said ridge gradually merging with said surface of said layer, the other surface of said layer having a depression therein opposite said ridge, said ridge and depression defining a thickened reinforcement in said layer.

3. An article comprising a layer of deposited rubber having an opening therein, the margin of the layer defining said opening having a ridge of deposited rubber integral therewith comprising a thickened reinforcement and projecting from one surface of said layer around said opening and in spaced relation thereto, the surface of said ridge gradually merging with the adjacent surface of said layer, the portions of said layer at each side of said ridge being of substantially equal thickness.

4. An article, comprising a layer of deposited rubber having an opening therein, the margin of the layer defining said opening having a plurality of spaced ridges of deposited rubber integral therewith comprising thickened reinforcements projecting from one surface of said layer around said opening, the surface of each of said ridges gradually merging with said surface of said layer, the thickness of said layer between adjacent ridges being substantially equal to the thickness of the layer adjacent said margin.

5. A thin, seamless, deposited rubber article having a marginal layer reinforced by an integral corrugation therein, said corrugation being curved in cross-section and being thicker than the adjacent portion of the article.

ABRAHAM N. SPÁNEL.